United States Patent [19]
Johnston

[11] Patent Number: 4,457,418
[45] Date of Patent: Jul. 3, 1984

[54] SAFETY SYSTEM

[75] Inventor: Robert W. Johnston, Auburndale, Mass.

[73] Assignee: Black & Webster, Inc., Waltham, Mass.

[21] Appl. No.: 322,990

[22] Filed: Nov. 19, 1981

[51] Int. Cl.³ .......................... B30B 15/16; F16P 3/00
[52] U.S. Cl. ................................ 192/129 B; 192/134; 192/137; 100/53
[58] Field of Search ............... 192/134, 129 B, 137; 100/53

[56] References Cited

U.S. PATENT DOCUMENTS

| | | | |
|---|---|---|---|
| 3,315,049 | 4/1967 | Cain | 200/61.42 |
| 3,487,182 | 12/1969 | Grundy | 100/53 X |
| 3,507,212 | 4/1970 | Matteson | 100/53 |
| 3,509,976 | 5/1970 | Coon | 192/129 B X |
| 3,628,357 | 12/1971 | Luenser | 100/53 X |
| 3,889,586 | 6/1975 | Pretty | 100/53 |
| 3,939,314 | 2/1976 | Loeser | 192/134 X |
| 4,026,204 | 5/1977 | Good | 100/53 |
| 4,044,445 | 8/1977 | Douri | 192/134 X |
| 4,104,978 | 8/1978 | Takahashi et al. | 192/129 A X |
| 4,113,079 | 9/1978 | Wright | 192/129 B |
| 4,131,189 | 12/1978 | Stephens | 192/129 B |
| 4,172,415 | 10/1979 | Baltschum | 192/129 A X |
| 4,190,143 | 2/1980 | Orita | 192/129 B X |
| 4,192,414 | 3/1980 | Baltschum | 192/134 X |
| 4,202,433 | 5/1980 | Baltschum | 192/134 X |
| 4,233,919 | 11/1980 | Takahashi | 192/129 A X |
| 4,395,641 | 7/1983 | Dise | 192/134 X |

FOREIGN PATENT DOCUMENTS

| | | | |
|---|---|---|---|
| 742909 | 6/1980 | U.S.S.R. | 100/53 |
| 750423 | 7/1980 | U.S.S.R. | 100/53 |

Primary Examiner—Rodney H. Bonck
Assistant Examiner—David D. House
Attorney, Agent, or Firm—Joseph S. Iandiorio

[57] ABSTRACT

A safety system for a power stroke machine including: a probe for sensing an obstruction in the work area; means for moving the probe between an extended position to sense obstructions in the work area and a retracted position; means for detecting the probe in the retracted position; means for detecting the probe in the extended position; start switch means for driving the means for moving, to selectively move the probe to the extended and retracted positions; a power output circuit, responsive to the start switch means and the means for detecting the probe in the extended position, for providing a power output to operate a power stroke machine when the start switch means is closed and the probe is in the extended position; a reset circuit for providing a set output in response to either the start switch means being closed or the probe being not retracted; a latching circuit responsive to the set output and the power output, for providing a latch output as long as the set output continues; and an output control circuit responsive to the latch output for transmitting the initially occurring power output and blocking subsequent power outputs until the reset circuit is cancelled in response to the start switch means being open and the probe being retracted.

10 Claims, 4 Drawing Figures

SAFETY SYSTEM

FIELD OF INVENTION

This invention relates to a safety system for a power stroke machine which prevents subsequent power strokes unless both the start switch is released and the probe or sensor is retracted and re-extended.

BACKGROUND OF INVENTION

Conventional safety systems for machines having power stroke operation such as presses, riveters, and the like, often employ a safety circuit which must be enabled by the proper positioning of a sensor bar at the work area free of obstructions before a start switch can be effective to actuate a power stroke of the machine. In one such system the start switches enable a solenoid to drop the probe toward the work area. If there is no obstruction, as the probe arrives at the work area it trips a switch which powers the ram. In another system, closing the start switch enables a solenoid to permit the probe to drop to the work area, whereupon it trips a switch and fires the power ram. While such arrangements address the simple problem of preventing firing of the power stroke machine, they do not address the more complex problems introduced by misuse and abuse of the safety system. For example, once the first power stroke occurs subsequent strokes can often be initiated by holding down the start switch and simply raising and lowering the probe so that it becomes the operating switch. The safety factor introduced by the use of two start switches in series is overcome by taping down or otherwise holding down one or both of them. In another circumvention the start switch is quickly released and re-closed to initiate another power stroke while the probe remains down at the work area continually without being retracted for insertion of each new workpiece. These avoidances of the proper operation of the safety system create serious hazards for the operator. Often the operator may properly be lifting the probe to insert a new workpiece while inadvertently keeping the start switch closed. This, too, can result in a dangerous situation: in riveting machines, rivets which strike the hardened work surface of the machine in the absence of a workpiece can become lethal, high-speed projectiles hazardous to all in the area.

SUMMARY OF INVENTION

It is therefore an object of this invention to provide an improved safety system for use with power stroke machines.

It is a further object of this invention to provide such an improved safety system which prevents operation by circumvention of the safety system.

It is a further object of this invention to provide such an improved safety system which prevents operation by quick release and re-closing of the main start switch or by retraction, then re-extension of the probe while the main switch is held closed.

This invention results from the realization that a truly effective, safe system can be made by using the first power output which initiates a power stroke, to cause a block against further power outputs until both the start switch has been released and the probe has been retracted and then extended.

The invention features a safety system for a power stroke machine. There is a probe for sensing an obstruction in the work area and means for moving the probe between an extended position to sense obstructions in the work area and a retracted position. There are means for detecting the probe in the retracted position and means for detecting the probe in the extended position. Start switch means drive the means for moving to selectively move the probe to the extended and retracted positions. A power output circuit responds to the start switch means and the means for detecting the probe in the extended position for providing a power output to operate a power stroke machine when the start switch means is closed and the probe is in the extended position. A reset circuit provides a set output in response to either the start switch means being closed or the probe being not retracted. A latching circuit responsive to the set output and the power output provides a latch output as long as the set output continues. A power control circuit, responsive to the latch output transmits the initially occurring power output and blocks subsequent power outputs until the reset unit is cancelled in response to the start switch means being opened and the probe being retracted.

In a preferred embodiment the system is pneumatic. The means for moving may include a cylinder and piston, and the means for detecting the probe in the retracted position may include a bleed port. The means for detecting the probe in the extended position may also include a bleed port. The power output circuit may include an amplifier valve having a primary input from the start switch means and a control input from the means for detecting the probe in the extended position. The reset circuit may include a Not valve with a pilot input from the means for detecting the probe in the retracted position and an Or valve responsive to the Not valve and the start switch means. The latching circuit may include an Or valve and a Yes valve with its pilot input connected to the Or valve and its primary input connected to the reset circuit. The Or valve may have one input from the power output circuit and a second fed back from the output of the Yes valve. The output control circuit may include a first Not valve having its primary input from the latching circuit and a second Not valve having its pilot input from the output of the first Not valve. The pilot input to the first Not valve may be derived from the output of the second Not valve.

DISCLOSURE OF PREFERRED EMBODIMENT

Other objects, features and advantages will occur from the following description of a preferred embodiment and the accompanying drawings, in which.

The invention may be accomplished in a safety system for a power stroke machine in which there is a probe for sensing an obstruction in a work area and means for moving the probe between an extended position to sense obstructions in the work area and a retracted position. The means for moving may be an electric solenoid, a pneumatic cylinder, or any similar device, depending upon the selected implementation of the system according to the invention. There are means for detecting the probe in a retracted position and means for detecting the probe in the extended position, for example, microswitches, capacitors, or magnetic proximity devices, or pressure ports and pneumatic systems. A start switch drives the means for moving to selectively move the probe between the extended and retracted positions.

The start switch may be an electrical switch or a pneumatic switch or any suitable actuating device. There is a power output circuit responsive to the start switch and the means for detecting the probe in the extended position to provide a power output to operate a power stroke machine when the start switch is closed and the probe is in the extended position. This may be implemented simply by a pneumatic or an electronic gating circuit in which the start switch provides the main power to the gate and the sensing that the probe is in the extended position provides an output to the control electrode of an electronic circuit or to the pilot input of a pneumatic device or a hydraulic device, for example.

A reset circuit provides a set output in response to either the start switch being closed or the probe being not fully retracted. Typically, a pneumatic or an electronic Or gate is responsive at one input to the start switch and at the other input to a detection that the probe is in the retracted position. A latch circuit responds to the set output and the power output for providing a latch output as long as the set output continues, and there is an output control unit responsive to the latch output for transmitting the initially occurring power output and blocking subsequent power outputs until the reset unit is cancelled in response to the start switch being opened and the probe being retracted. The system may be implemented with electronic logic, hydraulic or pneumatic logic. In the specific embodiment in this disclosure the logic is pneumatic.

Figure 1:
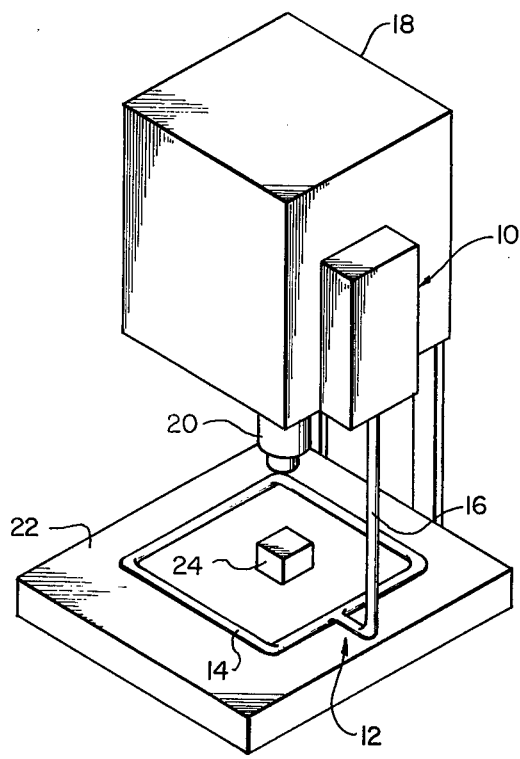
FIG. 1 is an axonometric diagram of a power stroke machine utilizing a safety system according to this invention.

There is shown in FIG. 1 a safety system 10 according to this invention including a probe 12 having a sensor section 14 carried by a support arm 16. Safety system 10 is mounted on a power stroke machine 18 such as a riveter or press, whose ram 20 faces the work surface 22. A workpiece 24 is positioned on work surface 22 well within sensor section 14 so that sensor section 14 may be moved all the way down to work surface 22 without encountering workpiece 24, the operator's hand, or any other obstruction. When this occurs, and a start switch or switches are operated, the power stroke machine actuates ram 20 to operate on workpiece 24.

Figure 2:
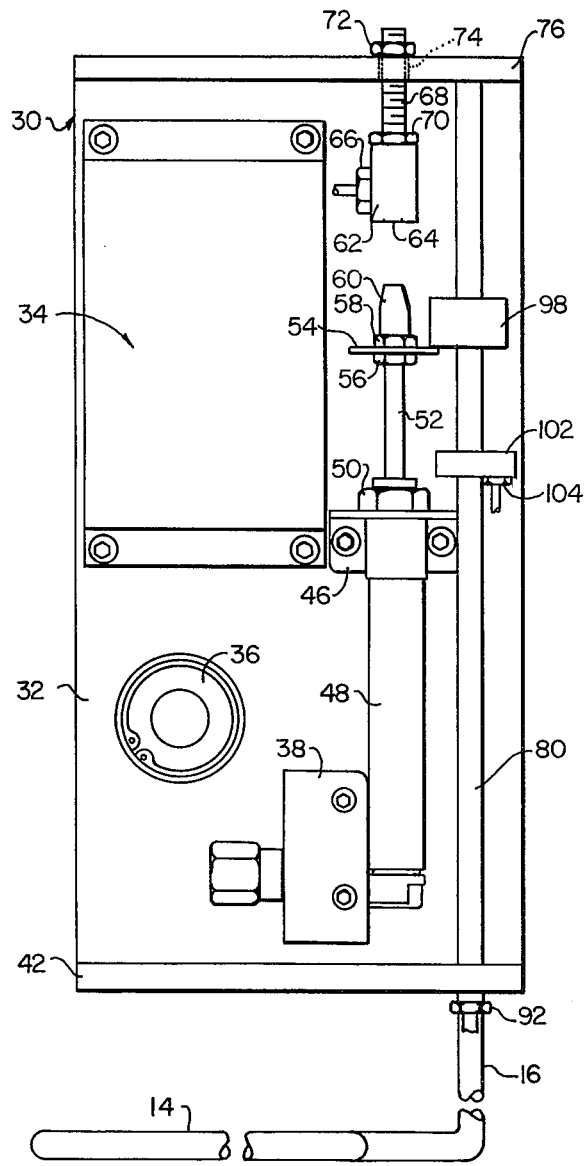
FIG. 2 is a front elevational view of the safety system according to this invention shown in FIG. 1.

Safety system 10, as shown in FIG. 2 with cover removed, includes a housing 30 on whose back wall 32 is mounted logic box 34, amplifying valve 36, and Not valve 38. Mounted on the back wall is bracket 46, which supports cylinder 48, secured thereto by means of jam nut 50. Piston rod 52 carries at its upper end lift washer 54 mounted between jam nuts 56 and 58, above which is rod end 60. Directly above and in line with rod end 60 is stop 62, at whose lower end is located bleed port 64, which is closed by rod end 60 when it is in the fully extended position. Air pressure is provided to coupling 66 and stop 62, which is mounted on threaded shaft 68 and positioned by means of jam nut 70 in conjunction with nut 72 and threads 74 in top section 76.

Figure 3:
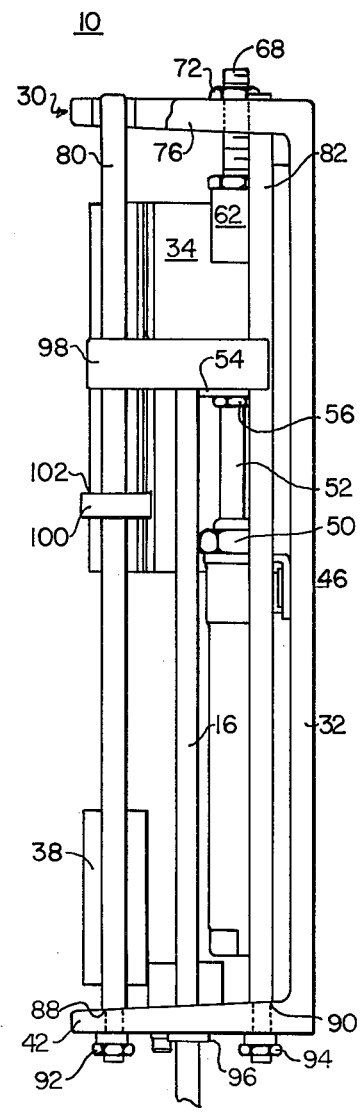
FIG. 3 is a side elevational view of the safety system of this invention as shown in FIG. 2.

Two fixed shafts, 80, 82, FIGS. 2 and 3, are mounted in top section 76. The lower ends of fixed shafts 80, 82 are reduced to form shoulders 88, 90, against which jam nuts 92, 94 can be tightened. Support arm 16 is received in bushing 96 in bottom section 42 and is fixed at its top end to a plastic sliding block 98. A sensing collar 100 is mounted on fixed shaft 80. Sensing collar 100 has a bleed port 102, FIG. 2, which is fed by a coupling 104. When cylinder 48 is pressurized to move rod 52 upwardly, slide block 98 is moved upwardly also, enabling bleed port 102 to vent. Conversely, when rod 52 is moved downwardly in cylinder 48, sliding block 98 covers bleed port 102 and prevents it from venting. In like manner, when rod 52 is driven upward, rod end 60 closes bleed port 64 and when rod end 60 is moved downwardly bleed port 64 is free to vent.

Figure 4:
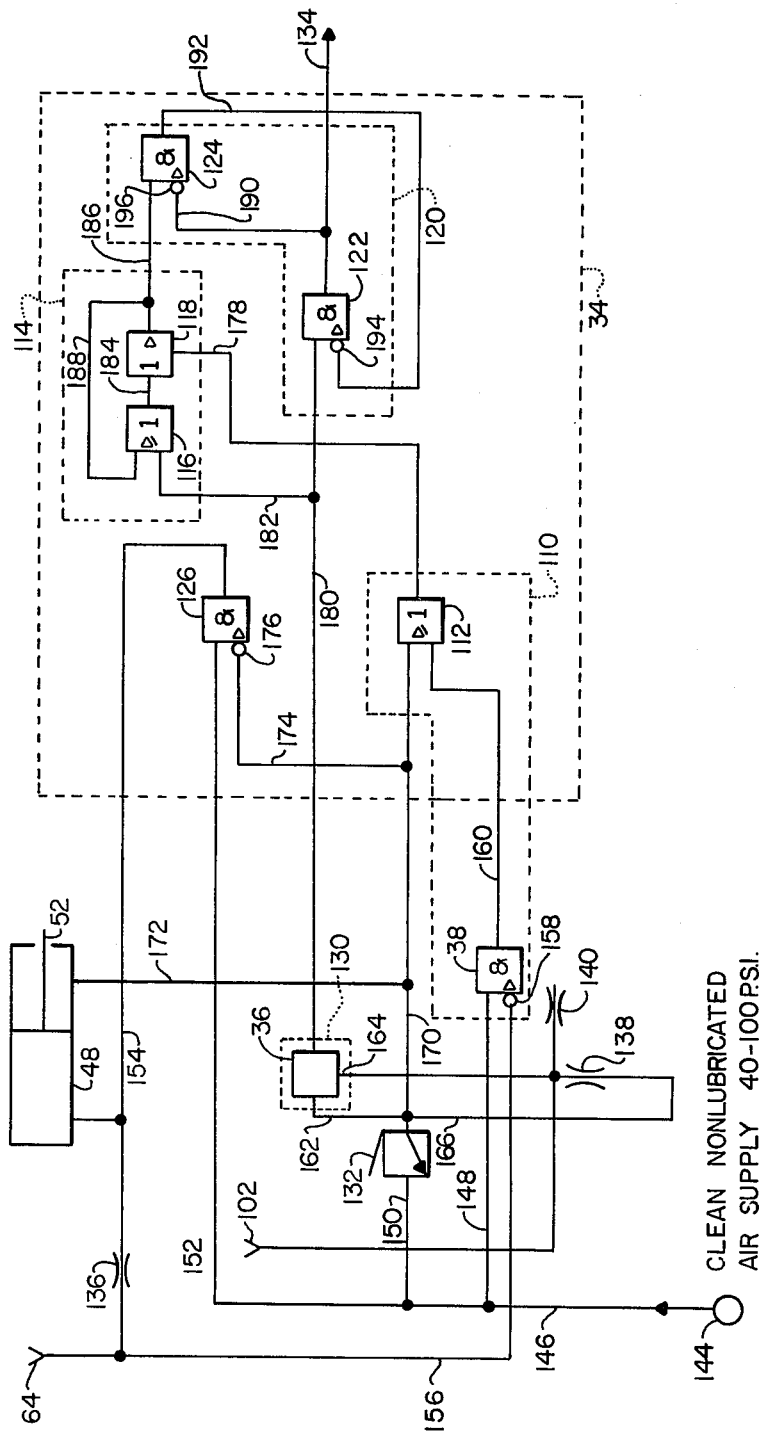
FIG. 4 is a schematic diagram of the safety system according to this invention.

A complete implementation of an embodiment according to this invention, including the logic components hidden from view in logic box 34 in FIGS. 2 and 3, is shown in FIG. 4. Within logic box 34 there is shown reset circuit 110, which includes Not valve 38 and Or valve 112. Latch circuit 114 housed in logic box 34 includes Or valve 116 and Yes valve 118. Also housed in logic box 34 is output control circuit 120, which includes Not gates 122 and 124. Also in logic box 34 is Not gate 126, which together with cylinder 48 and rod 52 provides the means to move the probe between an extended position to sense obstructions in the work area and a retracted position. Bleed port 64 provides the means for detecting when the probe is in the retracted position, and bleed port 102 provides the means for detecting when the probe is in the extended position. Amplifier valve 36 may be used to implement the power output circuit 130, which when properly gated responds to the closing of start valve 132 by providing a power output on line 134 to drive the power stroke machine, either directly or through some intermediate pneumatic, electrical or other means. Orifices 136, 138, and 140 are used to restrict the air flow as necessary to implement the operation of the circuit. A clean, non-lubricated source 144 of air at 40-100 psi normally supplies air pressure over line 146 to the primary input 148 of Not gate 38, and on line 150 to the input of start valve 132, and on line 152 to Not valve 126. A Not valve is one which normally passes air right through it from input to output when there is no pressure at its pilot input. When pressure is provided at its pilot input then the output is cut off from the input and the output line is bled off. An Or valve is simply one which produces an output if either one or more of its inputs is present. A Yes valve is a valve whose input is not normally connected to its output in the absence of pilot pressure, but when pilot pressure is applied, then the input is connected to the output.

Normally, Not valve 126 is passing the pressure on line 152 directly through to line 154, to pressurize cylinder 48 and drive rod 52 to the right in FIG. 4. This drives rod end 60, FIG. 2, up against bleeder port 64 and prevents that port from venting. That causes an increase in pressure in line 156 which pressurizes pilot input 158 of Not valve 38 and therefore cuts off its input over line 148 from its output over line 160.

When next start valve 132 is closed, the pressure on line 150 is immediately made available to the primary input over line 162 of amplifier valve 36, and also to the control input 164 of amplifier valve 36 via an input line 166 in orifice 138. However, since rod 52 is in the uppermost position, bleeder port 102 is uncovered and thus vented, so that the pressure at control input 164 is insufficient to operate amplifier valve 36. However, the closing of start valve 132 also provides pressurized output on line 170 which has three effects: first, it provides pressure over line 172 to cylinder 48 to drive rod 52 back into cylinder 48, to the left in FIG. 4. It also simultaneously provides the same pressure on line 174 to the pilot input 176 of Not valve 126. This cuts off the input on line 152 from the output on line 154 and bleeds line 154 so that that end of cylinder 48 is de-pressurized and rod 52 can move inwardly. Finally, the output on line 170 provided by the closing of valve 132 provides one input to Or valve 112, which then immediately pressurizes the primary input over line 178 to Yes valve 118. With the withdrawal of rod 52, rod end 60 is moved away from bleeder port 64 and thus the pressure in line 156 and at pilot input 158 is relieved so that the input pressure on line 148 to Not valve 38 is once again connected through to the output line 160, providing a second input to Or valve 112.

When rod 52 completely withdraws to the lower position, slide 98 will close bleeder port 102. This increases the pressure at the control input 164 to amplifier valve 36, which then provides the power output on line 180, which passes directly through Not valve 122 to provide the necessary actuating output on line 134. Simultaneously, the power output on line 180 is provided over line 182 to Or valve 116, which enables it to provide the pilot input on line 184 to Yes valve 118. Yes valve 118 now has its primary and pilot inputs present and provides an output on line 186 which is fed back on line 188 to the other input of Or valve 116 and is also fed to the primary input of Not valve 124. The power output on line 134 pressurizes pilot input 196 of Not valve 124. This prevents the input on line 186 from reaching the output on line 192. Since there is no output on line 192, pilot input 194 of Not valve 122 is not pressurized, and thus as previously indicated the power output from amplifier valve 36 on line 180 is passed directly through and out on power output line 134.

In this state, the first power stroke has been delivered on line 134, but according to the safety features of this invention the next power stroke cannot be delivered by circumventing the safety system. The probe must be completely raised, and the start valve released, then lowered, before reactuation of the start valve can repeat the cycle. For example, suppose, as is often the case, the operator quickly releases and then re-actuates start valve 132. Immediately upon release of start valve 132 the pressure on line 162 to the primary input of amplifier valve 36 is cut off. Thus the pressure on line 180 is cut off, and the pressure on the output side of Not valve 122 is also cut off. That cessation of pressure on line 134 is communicated on line 190 to the pilot input 196 of Not valve 124. This permits the input on line 186 to pass directly through Not valve 124 onto line 192, where it pressurizes pilot input 194 of Not valve 122. This immediately cuts off the input on line 180 from the output on line 134. Thus the next instant, when the momentary release of valve 132 is ended and start valve 132 is once again closed, the pressure on line 180 is stopped at Not valve 122 and will not again reach line 134.

No matter how many times start valve 132 is released and reclosed, the same result adheres. This is because initially, when Yes valve 118 was operated by the output from Or valve 116, the output generated by Yes valve 118 at that point was immediately fed back on line 188 to provide a second input to Or valve 116. Thus even though the momentary release of start valve 132, which de-energizes line 180, also de-energizes line 182 and the initial input to Or valve 116, it cannot disrupt the holding circuit established through line 178 to Yes valve 118 through line 188 to Or valve 116 and through line 184 to Yes valve 118. The only way that latching circuit 114 can be disabled, and so in turn disable output control circuit 120 so that Not valve 122 has its pilot input 194 de-pressurized and will once again connect the pressure on line 180 through to line 134, is if two things occur. First, start valve 132 must be released so that lines 180 and 182 are de-pressurized. In addition, reset circuit 110 must be disabled. That is, both inputs to Or valve 112 must be de-pressurized. To de-pressurize the input on line 170, again start valve 132 must be released, but to de-pressurize the input on line 160, Not valve 38 must have its pilot input 158 pressurized. For this, piston rod 52 must be moved upwardly, drawing probe 12 with it until rod end 60 closes bleed port 64. In that condition, pilot input 158 is again pressurized, and Not valve 38 will have its input on line 148 disconnected from its output on line 160. Then and only then will latch circuit 114 be disabled and in turn enable output control circuit 120, so that the pressure on line 180 can be directly communicated to line 134.

Circumvention of the safety system is also attempted by keeping start valve 132 closed while quickly raising the probe and letting it drop again. With the system as shown in FIG. 4, the raising of the probe simply vents bleed port 102. This de-pressurizes the control input 164 to amplifying valve 36 and de-pressurizes line 180. This also de-pressurizes line 182, so that as explained before the pressure on line 182 is no longer needed since Or valve and Yes valve 118 have been latched up by the feedback on line 188. As a result, this attempt at circumvention is ineffective, as it leaves Not valve 122 in the same blocking state with its pilot input pressurized and no connection between line 180 and line 134. It is thus apparent that a second and subsequent power stroke will not be available on line 134 until the probe has been raised and rod end 60 has closed bleeder port 64, de-pressurizing line 160, while valve 132 is released, de-pressurizing line 170 and line 180. In this condition, latching circuit 114 is disabled and the circuit will be restored to its initial condition. Then upon closing of start valve 132, cylinder rod 52 will be again withdrawn, allowing slide block 98 to cover bleeder port 102 and the next power stroke will be delivered from line 180 through Not valve 122 to output line 134.

Other embodiments will occur to those skilled in the art and are within the following claims:

What is claimed is:

1. A safety system for a power stroke machine comprising:
   a probe for sensing an obstruction in the work area;
   means for moving said probe between an extended position to sense obstructions in the work area and a retracted position;
   means for detecting said probe in said retracted position;
   means for detecting said probe in said extended position;
   start switch means for driving said means for moving to selectively move said probe between said extended and retracted positions;
   a power output circuit responsive to said start switch means and said means for detecting said probe in said extended position for providing a power output to operate a power stroke machine when said start switch means is closed and said probe is in said extended position;

a reset circuit for providing a set output in response to either said start switch means being closed or said probe being not retracted;

a latching circuit, responsive to said set output and said power output, for providing a latch output as long as said set output continues; and an output control circuit, responsive to said latch output for transmitting the initially occurring said power output and blocking subsequent said power outputs until said reset circuit provides a reset output in response to said start switch means being opened and said probe being retracted.

2. The system of claim 1 in which said system is pneumatic.

3. The system of claim 2 in which said means for moving includes a cylinder and piston.

4. The system of claim 3 in which said means for moving includes a Not valve.

5. The system of claim 2 in which said means for detecting said probe in said retracted position includes a retracted bleed port.

6. The system of claim 2 in which said means for detecting said probe in said extended position includes an extended bleed port.

7. The system of claim 2 in which said power output circuit includes an amplifier valve having a primary input from said start switch means and a control input from said means for detecting said probe in said extended position.

8. The system of claim 2 in which said reset circuit includes a Not valve with a pilot input from said means for detecting said probe in said retracted position and an Or valve responsive to said Not valve and said start switch means.

9. The system of claim 2 in which said latching circuit includes an Or valve and a Yes valve with its pilot input connected to said Or valve and its primary input connected to said reset circuit, said Or valve having one input from said power output circuit and a second fed back from the output of said Yes valve.

10. The system of claim 2 in which said output control circuit includes a first Not valve having its primary input from said latching circuit and a second Not valve having its primary input from said power output circuit and its pilot input from the output of said first Not valve, said pilot input to said first Not valve being from the output of said second Not valve.

* * * * *